(12) United States Patent
Kao

(10) Patent No.: US 12,411,350 B2
(45) Date of Patent: Sep. 9, 2025

(54) METALENS-INTEGRATED OPTICAL ENGINE

(71) Applicant: Wuyun Co., Inc., Taichung (TW)

(72) Inventor: Po-Sung Kao, Taichung (TW)

(73) Assignee: Wuyun Co., Inc., Taichung (TW)

( * ) Notice: Subject to any disclaimer, the term of this patent is extended or adjusted under 35 U.S.C. 154(b) by 683 days.

(21) Appl. No.: 17/744,246

(22) Filed: May 13, 2022

(65) Prior Publication Data

US 2023/0136420 A1    May 4, 2023

(30) Foreign Application Priority Data

Oct. 29, 2021   (TW) .................. 110140442

(51) Int. Cl.
| | |
|---|---|
| *G02B 1/00* | (2006.01) |
| *G02B 5/18* | (2006.01) |
| *G02B 27/00* | (2006.01) |
| *G02B 27/09* | (2006.01) |
| *G02B 27/10* | (2006.01) |
| *G02B 27/30* | (2006.01) |

(52) U.S. Cl.
CPC ......... *G02B 27/1006* (2013.01); *G02B 1/002* (2013.01); *G02B 5/1809* (2013.01); *G02B 5/1871* (2013.01); *G02B 5/189* (2013.01); *G02B 27/0025* (2013.01); *G02B 27/0927* (2013.01); *G02B 27/30* (2013.01); *G02B 2207/101* (2013.01)

(58) Field of Classification Search
CPC .. G02B 27/1006; G02B 1/002; G02B 5/1809; G02B 5/1871; G02B 5/189; G02B 27/0025; G02B 27/0927; G02B 27/30; G02B 2207/101; G02B 27/10; G02B 3/08; G02B 27/0101; G02B 27/0938; G02B 27/102; G02B 27/12
USPC .......................................... 359/558
See application file for complete search history.

(56) References Cited

U.S. PATENT DOCUMENTS 11,057,115 B1 *  7/2021  Lin .................. G02B 27/0905

FOREIGN PATENT DOCUMENTS

KR         20190074144 A  *  6/2019

* cited by examiner

Primary Examiner — Pinping Sun
Assistant Examiner — Alaina Marie Swanson
(74) Attorney, Agent, or Firm — Blank Rome LLP

(57) ABSTRACT

A metalens-integrated optical engine includes a plurality of light source modules, a collimating and deflecting module and a light-combining module. Each of the light source modules emits a light beam. The collimating and deflecting meta optical members is for collimating and deflecting the light beams such that the light beams are collimated and deflected and travel to a predetermined position. The light-combining module includes a light-combining meta optical array that is located at the predetermined position, that receives the light beams via the collimating and deflecting module, and that deflects the light beams, so as to combine the non-parallel light beams into a single light beam.

8 Claims, 10 Drawing Sheets

METALENS-INTEGRATED OPTICAL ENGINE

CROSS-REFERENCE TO RELATED APPLICATION

This application claims priority to Taiwanese Invention Patent Application No. 110140442, filed on Oct. 29, 2021.

FIELD

The disclosure relates to an optical device, and more particularly to a metalens-integrated optical engine.

BACKGROUND

Referring to FIG. 1, a conventional optical engine includes three light sources 11 (e.g., red (R), green (G) and blue (B)), three collimating lenses 12 each of which is located on the light path of a respective one of the light sources 11, and three beam splitters 13 that respectively correspond to the light paths of the light sources 11. In FIG. 1, the leftmost beam splitter 13 reflects red light (or all lights), the middle splitter 13 reflects green light and permits the red light to travel therethrough, and the rightmost splitter 13 reflects blue light and permits the red light and the green light to travel therethrough. As such, the red light, the green light and the blue light are combined to form white light.

However, the sizes of the abovementioned collimating lenses 12 and beam splitters 13 are relatively large. In order to reduce the size of the conventional optical engine, the distances among the light sources 11 and the sizes of the optical components should be reduced. The manufacturing precision of relatively small collimating lenses is difficult to maintain. Higher precision of positioning among relatively small optical components during assembly of the optical components is required to be higher. Thus, with current technical limitations, the size of the conventional optical engine is very difficult to reduce. However, smaller optical engines are in heavy demanded due to the growth of applications including augmented reality (AR), virtual reality (VR) and micro projection.

SUMMARY

Therefore, an object of the disclosure is to provide a metalens-integrated optical engine that can alleviate at least one of the drawbacks of the prior art.

According to an aspect of the disclosure, the metalens-integrated optical engine includes a plurality of light source modules, a collimating and deflecting module and a light-combining module. Each of the light source modules emits a light beam with particular wavelength. The collimating and deflecting module includes a plurality of collimating and deflecting meta optical members each of which is located on the path of the light beam emitted by a respective one of the light source modules. The collimating and deflecting meta optical members is for collimating and deflecting the light beams emitted by the light source modules such that the light beams emitted by the light source modules are collimated and deflected and travel to a predetermined position. The light-combining module includes a light-combining meta optical member that is located at one side of the collimating and deflecting module opposite to the light source modules. The light-combining meta optical member includes a light-combining meta optical array that is located at the predetermined position, that receives the light beams collimated and deflected via the collimating and deflecting module, and that deflects the light beams based on wavelengths and angles of incidence, so as to combine the non-parallel light beams into a single light beam.

According to another aspect of the disclosure, the metalens-integrated optical engine includes a plurality of light source modules, a collimating and deflecting module, a shaping module and a light-combining module. Each of the light source modules emits a light beam with particular wavelength. The collimating and deflecting module includes a plurality of collimating and deflecting meta optical members each of which is located on the path of the light beam emitted by a respective one of the light source modules. The collimating and deflecting meta optical members is for collimating and deflecting the light beams emitted by the light source modules such that the light beams emitted by the light source modules are collimated and deflected and travel to a predetermined position. Each of the collimating and deflecting meta optical members includes a substrate that has a surface extending along an X-axis and a Y-axis, and a collimating and deflecting meta optical array that is disposed on the surface, that permits incidence of the light beams emitted by the respective one of the light source modules, and that includes a plurality of nanostructures arranged in an array. Each of the nanostructures extends along a Z-axis that is perpendicular to the surface. The nanostructures of the collimating and deflecting meta optical array of n-th collimating and deflecting meta optical member satisfy a phase shift formula relative to a center of an optical axis:

$$\Delta\varphi_{nC}(x_n, y_n) = -\frac{2\pi}{\lambda_n}\left(\sqrt{x_n^2 + f_{xcn}^2} - f_{xcn} + \sqrt{y_n^2 + f_{ycn}^2} - f_{ycn} - (x_n\cos\theta_n + y_n\sin\theta_n)\sin\gamma_n\right) - \Delta\Phi_{nC}(x_n, y_n)$$

wherein $\Delta\Phi_{nC}(x_n, y_n) = \frac{2\pi}{\lambda_n}\sum_{i=0}^{\infty}\sum_{j=0}^{\infty}a_{nij}x_n^{2i}y_n^{2j}$, and $2i+2j \geq 4$. n denotes all positive integers no greater than N, and N is the number of the collimating and deflecting meta optical members, $\Delta\varphi_{nC}(x_n, y_n)$ denotes the phase shift of n-th light beam relative to the center of an optical axis of the collimating and deflecting meta optical array of n-th collimating and deflecting meta optical member generated by the collimating and deflecting meta optical array of n-th collimating and deflecting meta optical member. An origin of the coordinate system is defined to be the center of the optical axis of the collimating and deflecting meta optical array of n-th collimating and deflecting meta optical member. $\Delta\varphi_{nC}(0,0)=0$. $(x_n, y_n)$ denotes the position of each of the nanostructures of the collimating and deflecting meta optical array of n-th collimating and deflecting meta optical member in the coordinate system. $\lambda_n$ is the wavelength of n-th light beam. $f_{xcn}$ is the focal length of the collimating and deflecting meta optical array along the X-axis. $f_{ycn}$ is the focal length of the collimating and deflecting meta optical array along the Y-axis. $\theta_n$ is the angle formed between the X-axis and the imaging light beam of n-th light beam. $\gamma_n$ is the angle formed between the Z-axis and the imaging light beam of n-th light beam. $\Delta\Phi_{nC}(x_n,y_n)$ is high-order term, and is for compensating the phase shift of high-order optical aberration. $\alpha_{nij}$ are predetermined coefficients. The shaping module includes a plurality of shaping meta optical arrays. Each of the shaping meta optical arrays is disposed on a disposing surface of a respective one of the collimating and deflecting meta optical members for shaping the light beams emitted by the respective one of the light source modules. The light-combining module receives the light beams collimated and deflected via the collimating and deflecting module, and combines the non-parallel light beams into a single light beam.

BRIEF DESCRIPTION OF THE DRAWINGS

Other features and advantages of the disclosure will become apparent in the following detailed description of the embodiments with reference to the accompanying drawings, of which:

FIGS. 7 to 9 are fragmentary perspective views illustrating the shaping module, wherein FIGS. 8 and 9 are enlarged views of regions A and B of FIG. 7;

FIGS. 10 to 12 are fragmentary perspective views illustrating the shaping module of another example, wherein FIGS. 11 and 12 are enlarged views of regions C and D of FIG. 10;

DETAILED DESCRIPTION

Figure 1:
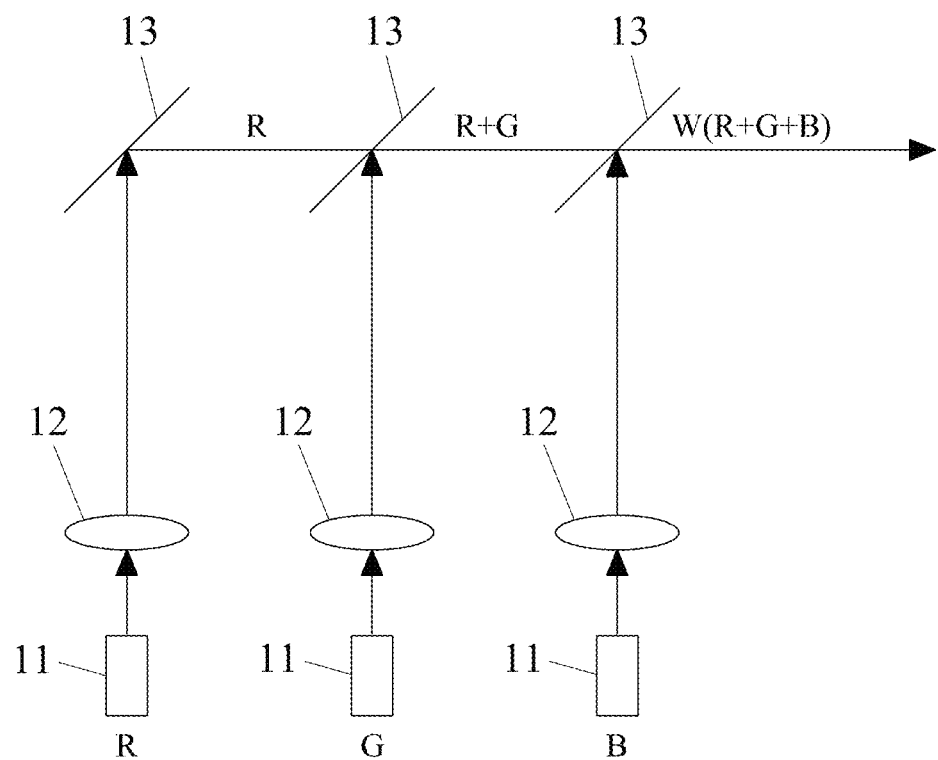
FIG. 1 is a schematic view illustrating a conventional optical engine.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
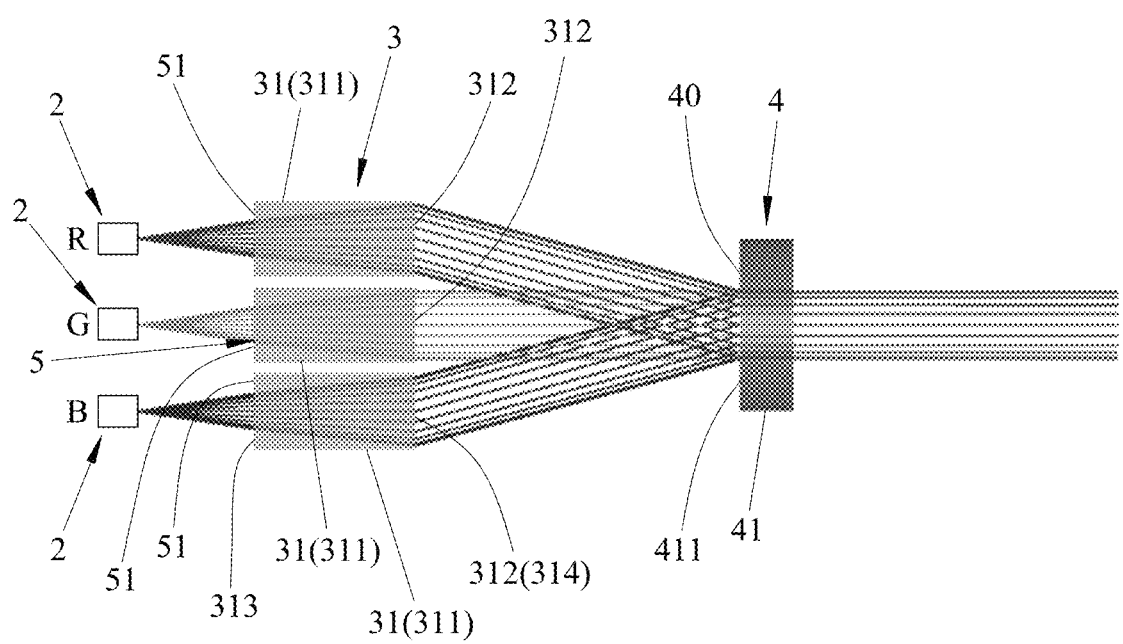
FIG. 2 is a schematic view illustrating an embodiment of the metalens-integrated optical engine according to the disclosure.

Referring to FIG. 2, an embodiment of the metalens-integrated optical engine according to the disclosure includes a plurality of light source modules 2, a collimating and deflecting module 3 and a light-combining module 4. In some embodiments, the metalens-integrated optical engine may further include a shaping module 5. The metalens-integrated optical engine may include the shaping module 5 for shaping light beams when being used in augmented reality (AR) and virtual reality (VR) applications, however, when the metalens-integrated optical engine is used in micro projection, the shaping module 5 may be omitted.

Each of the light source modules 2 emits a light beam with particular wavelength(s). There are three light source modules 2 in this embodiment. The light source modules 2 emit red light, green light and blue light, respectively. The number of the light source modules 2 and the wavelength(s) of the lights emitted by the light source modules 2 may vary according to practical requirements, and may not be limited by these embodiments. In one embodiment, the light source module 2 may be configured as a laser light source, which has high frequency modulation and narrowband characteristics.

Figure 3:
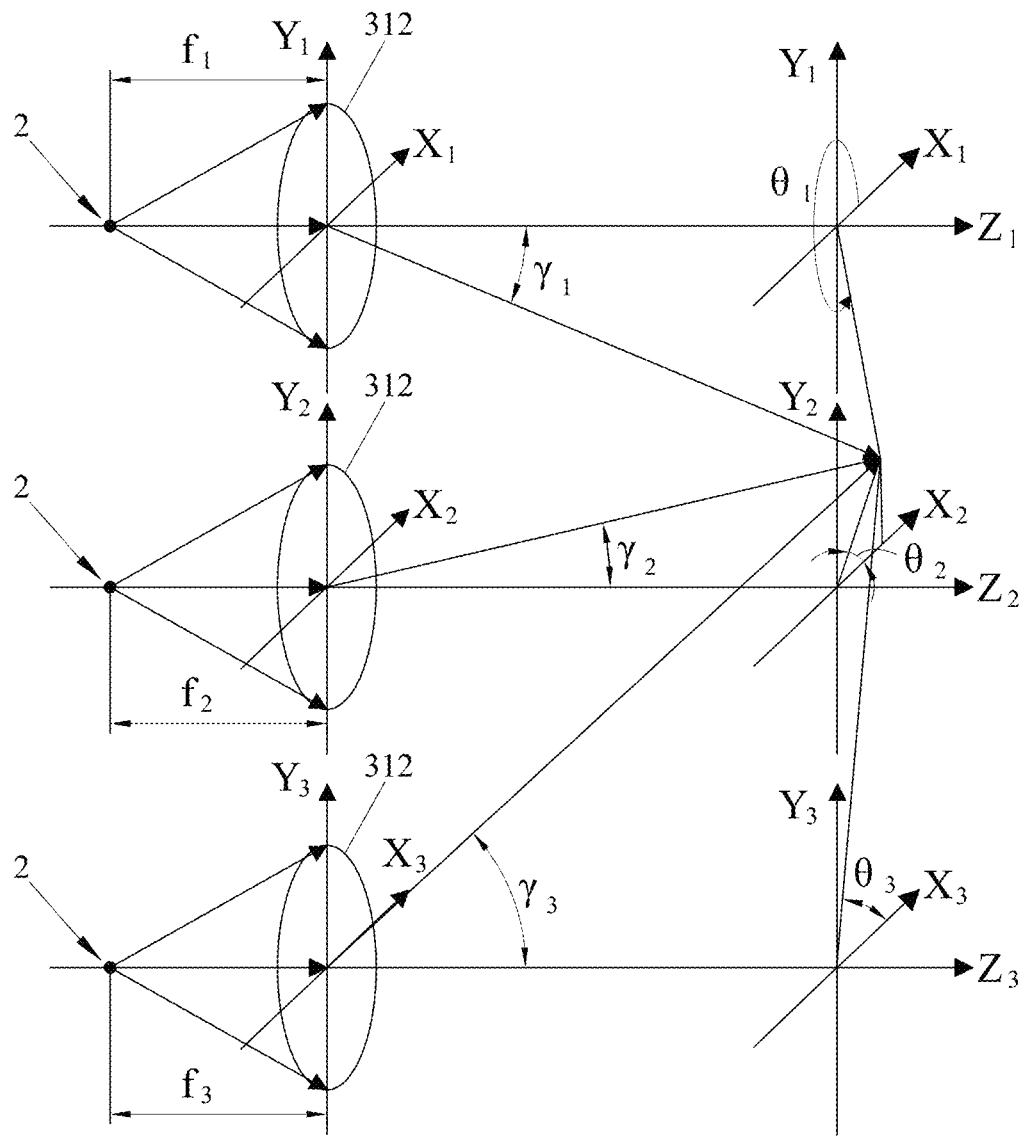
FIG. 3 is a schematic view illustrating light beams travelling in the embodiment.

Referring to FIGS. 2 and 3, the collimating and deflecting module 3 includes a plurality of collimating and deflecting meta optical members 31 each of which is located on the path of the light beam emitted by a respective one of the light source modules 2. The collimating and deflecting meta optical members 31 are for collimating and deflecting the light beams emitted by the light source modules 2 such that the light beams emitted by the light source modules 2 are collimated and deflected, and travel to a predetermined position on the light-combining module 4.

Each of the collimating and deflecting meta optical members 31 includes a substrate 311 and a collimating and deflecting meta optical array (not shown).

The substrate 311 of each of the collimating and deflecting meta optical members 31 has a surface 312 that extends along an X-axis (see $X_1$ to $X_3$ in FIG. 3) and a Y-axis (see $Y_1$ to $Y_3$ in FIG. 3).

The collimating and deflecting meta optical array of each of the collimating and deflecting meta optical members 31 is disposed on the surface 312 of the collimating and deflecting meta optical member 31, permits incidence of the light beams emitted by the respective one of the light source modules 2, and includes a plurality of nanostructures (not shown) that are arranged in an array. Each of the nanostructures extends along a Z-axis (see $Z_1$ to $Z_3$ in FIG. 3) that is perpendicular to the surface 312.

The nanostructures of the collimating and deflecting meta optical array of n-th collimating and deflecting meta optical member 31 satisfy the phase shift formula relative to a center of an optical axis:

$$\Delta\varphi_{nC}(x_n, y_n) = \qquad\text{(Formula 1)}$$
$$-\frac{2\pi}{\lambda_n}\left(\sqrt{x_n^2 + y_n^2 + f_n^2} - f_n - (x_n\cos\theta_n + y_n\sin\theta_n)\sin\gamma_n\right) -$$
$$\Delta\Phi_{nC}(x_n, y_n);$$

Wherein, $$\Delta\Phi_{nC}(x_n, y_n) = \frac{2\pi}{\lambda_n}\sum\nolimits_{i=0}^{\infty}\sum\nolimits_{j=0}^{\infty} a_{nij}x_n^{2i}y_n^{2j}, \text{ and } 2i+2j \geq 4.$$

i=0,1,2, . . . , j=0,1,2, . . . , 2i+2j denotes order, and the condition 2i+2j≥4 is to compensate the phase shift of the 4th order or higher.

Wherein, n denotes all positive integers no greater than N, and N is the number of the collimating and deflecting meta optical members 31. $\Delta\varphi_{nC}(x_n,y_n)$ denotes the phase shift of n-th light beam (i.e., the light beam emitted by n-th light source module 2) relative to the center of the optical axis of the collimating and deflecting meta optical array of n-th collimating and deflecting meta optical member 31 generated by the collimating and deflecting meta optical array of n-th collimating and deflecting meta optical member 31. The origin (0, 0) of the coordinate system is defined to be the center of the optical axis of the collimating and deflecting meta optical array of n-th collimating and deflecting meta optical member 31. $\Delta\varphi_{nC}(0,0)=0$. $(x_n,y_n)$ denotes the position of each of the nanostructures of the collimating and deflecting meta optical array of n-th collimating and deflecting meta optical member 31 in the coordinate system. $\lambda_n$ is the wavelength of n-th light beam. $f_n$ is the focal length of n-th light beam. $\theta_n$ is the angle formed between the X-axis and the imaging light beam of n-th light beam. $\gamma_n$ is the angle formed between the Z-axis and the imaging light beam of n-th light beam. $\Delta\Phi_{nC}(x_n,y_n)$ is high-order term, and is specifically for compensating the phase shift of 4th order or higher order optical aberration in this embodiment. $\alpha_{nij}$ are predetermined coefficients (i.e., coefficients of polynomial).

The first half portion of Formula 1

$$-\frac{2\pi}{\lambda_n}\left(\sqrt{x_n^2+y_n^2+f_n^2}-f_n-(x_n\cos\theta_n+y_n\sin\theta_n)\sin\gamma_n\right)$$

depicts an ideal state of an optical system in which no optical aberration exists. However, a general optical system contains high-order optical aberration. When an optical system demands higher resolution, $\Delta\Phi_{nC}(x_n,y_n)$ serves to compensate the phase shift of the high-order optical aberration.

When an optical system contains 4th order and/or higher order optical aberration that needs to be compensated, the coefficients of polynomial $\alpha_{nij}$ can be found by conventional automatic optimization methods, so as to obtain the value of $\Delta\Phi_{nC}(x_n,y_n)$. When the 4th order and/or higher order optical aberration of an optical system need not be compensated, the coefficients of polynomial $\alpha_{nij}$ are zero, and the value of $\Delta\Phi_{nC}(x_n,y_n)$ is zero.

For example, if a parallel glass plate with a thickness of t has a refractive index of $n_{\lambda_n}$, and a light beam has an image distance of l after travelling through the glass plate, the glass plate would generate the 4th order term ($\alpha_{n20}x^4$, $\alpha_{n11}x^2y^2$, $\alpha_{n02}y^4$) optical aberration. When the optical aberration is generated in an optical system with n=1, the coefficients can be derived by analysis:

$$a_{120}=a_{102}=\frac{1}{2}a_{111}=-\frac{(n_{\lambda n}^2-1)t}{8n_{\lambda n}^3 l^4} \quad \text{(Formula 2)}$$

If other high-order optical aberration is to be compensated, a corresponding phase shift $\Delta\Phi_{nC}(x_n,y_n)$ can be obtained by the formula to compensate for the optical aberration. When the high-order optical aberration need not be compensated, the coefficients of polynomial $\alpha_{nij}$ are zero.

The setup of the nanostructures of the collimating and deflecting meta optical arrays of the collimating and deflecting meta optical members 31 can be referred to in Taiwanese Invention Patent Application No. 110126860.

It should be noted that, when the metalens-integrated optical engine includes the shaping module 5, the formula of the phase shift should be modified, and would be described in the following paragraphs.

Figure 4:
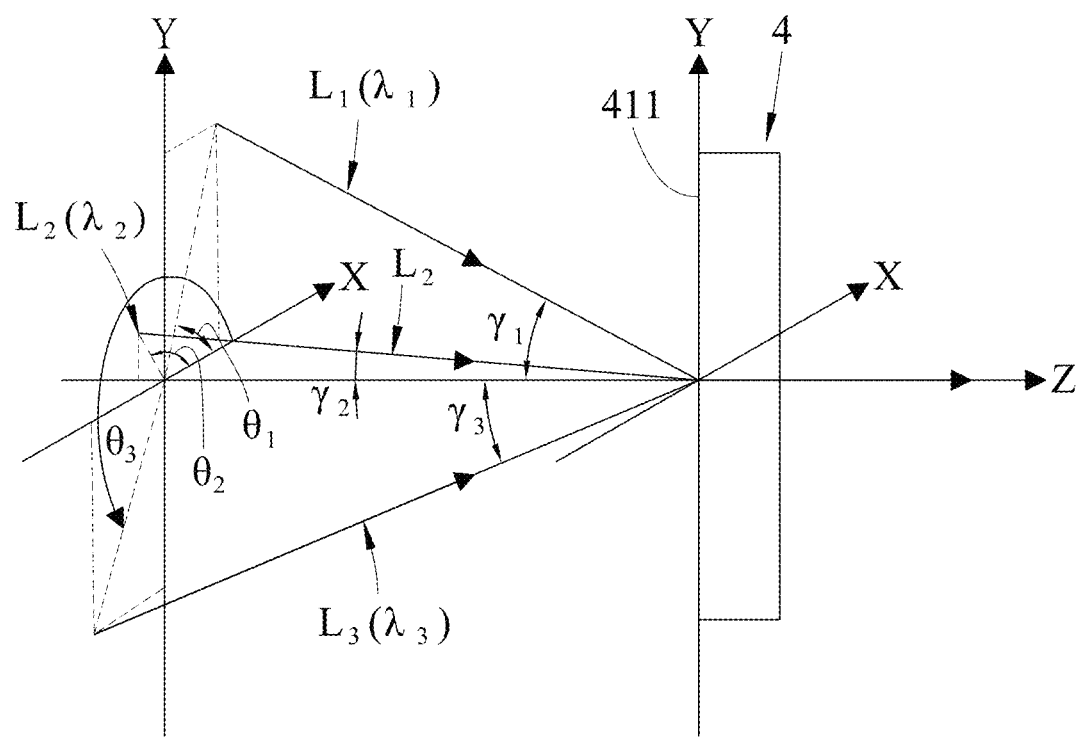
FIG. 4 is another schematic view illustrating the light beams travelling in the embodiment.

Referring to FIGS. 2 and 4, the light-combining module 4 is located at one side of the collimating and deflecting module 3 opposite to the light source modules 2, receives the light beams collimated and deflected via the collimating and deflecting module 3, and deflects the light beams, so as to combine the light beams into a single light beam. The light-combining module 4 may be implemented by conventional optical components (e.g., dichroic filter(s) or prism(s)). In this embodiment, the light-combining module 4 is implemented by meta optical component(s).

The light-combining module 4 includes a light-combining meta optical member 40 that is located at one side of the collimating and deflecting module 3 opposite to the light source modules 2. The light-combining meta optical member 40 includes a substrate 41 and a light-combining meta optical array (not shown). The light-combining meta optical array is located at the predetermined position on the light-combining module 4, receives the light beams collimated and deflected via the collimating and deflecting module 3, and deflects the light beams based on wavelengths and angles of incidence, so as to combine the non-parallel light beams into a single light beam.

The substrate 41 has a surface 411 that extends along an X-axis and a Y-axis.

The light-combining meta optical array is disposed on the surface 411, permits incidence of the light beams collimated and deflected via the collimating and deflecting module 3, and includes a plurality of nanostructures (not shown) that are arranged in an array. Each of the nanostructures extends along a Z-axis that is perpendicular to the surface 411.

The nanostructures of the light-combining meta optical array of the light-combining meta optical member 40 satisfy the phase shift formula relative to a center of an optical axis:

$$\Delta\varphi_{nL}(x,y)=\frac{2\pi}{\lambda_n}(x\cos\theta_n+y\sin\theta_n)\sin\gamma_n \quad \text{(Formula 3)}$$

Wherein, n denotes all positive integers no greater than N, and N is the number of the collimating and deflecting meta optical members 31. $\Delta\varphi_{nL}(x,y)$ denotes the phase shift of n-th light beam (labelled by $L_1$, $L_2$ and $L_3$ in FIG. 4) relative to the center of the optical axis of the light-combining meta optical array generated by the light-combining meta optical array. The origin (0, 0) of the coordinate system is defined to be the center of the optical axis of the light-combining meta optical array. $\Delta\varphi_{nL}(0,0)=0$. (x,y) denotes the position of each of the nanostructures of light-combining meta optical array in the coordinate system. $\lambda_n$ is the wavelength of n-th light beam. $\theta_n$ is the angle formed between the X-axis and the incident light beam of n-th light beam. $\gamma_n$ is the angle formed between the Z-axis and the incident light beam of n-th light beam.

The setup of the nanostructures of the light-combining meta optical arrays of the light-combining module 4 can be referred to in Taiwanese Invention Patent Application No. 110126861.

Figure 5:
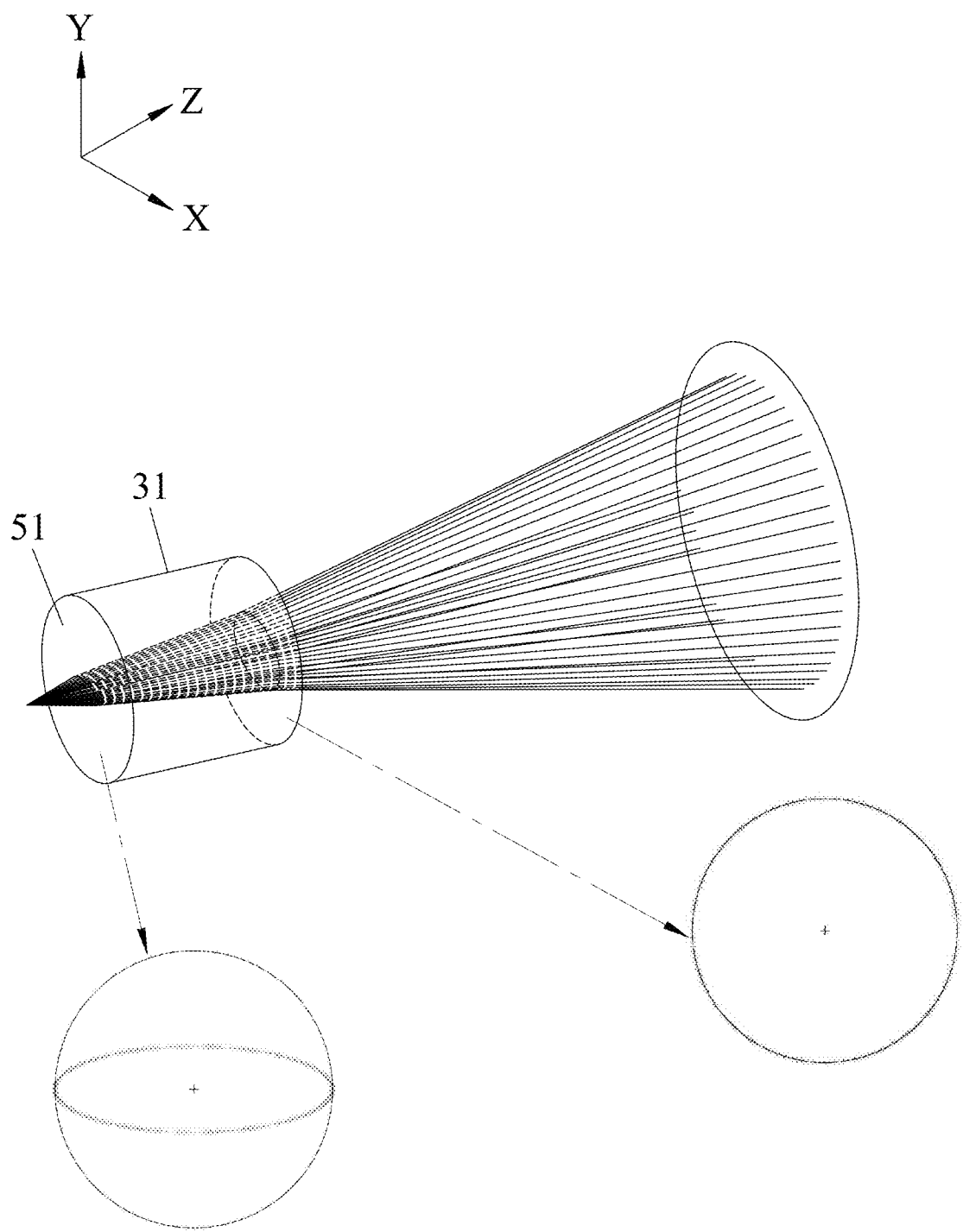
FIG. 5 is a schematic view illustrating a shaping module shaping the light beams.
Figure 6:
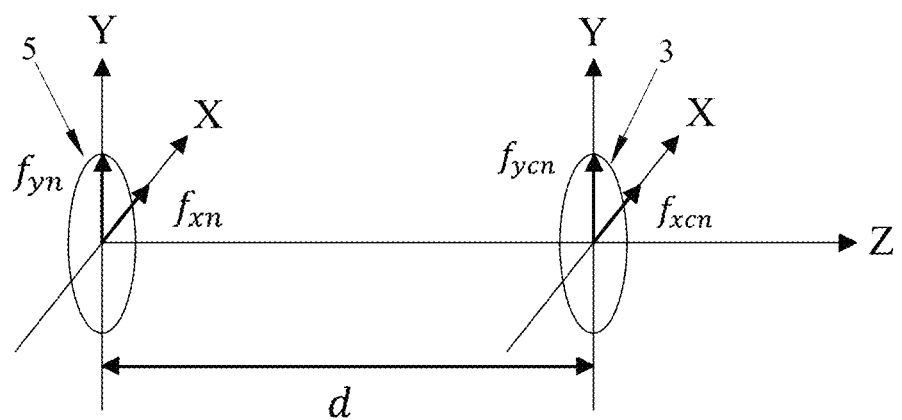
FIG. 6 is a schematic view illustrating the shaping module and a collimating and deflecting module.

Referring to FIGS. 2 and 5 to 9, the shaping module 5 is for shaping the light beams. With particular reference to FIG. 5, the shaping module 5 shapes a light beam such that the light beam has an elliptic cross-section at an incident surface and has a circular cross-section at an exit surface. The adjustment to the shape of the cross-section of the light beam may depend on practical requirements, and is not limited to such.

The shaping module 5 includes a plurality of shaping meta optical arrays 51. Each of the shaping meta optical arrays 51 is disposed on a disposing surface of a respective one of the collimating and deflecting meta optical members 31, permits incidence of the light beam emitted by the respective one of the light source modules 2, and includes a plurality of nanostructures 511 that are arranged in an array. Each of the shaping meta optical arrays 51 has a coordinate system that has an X-axis, a Y-axis and a Z-axis, and the disposing surface of the respective one of the collimating and deflecting meta optical members 31 extends along the X-axis and the Y-axis. Each of the nanostructures 511 extends along a Z-axis that is perpendicular to the disposing surface.

The nanostructures 511 of n-th shaping meta optical array 51 satisfy the phase shift formula relative to a center of an optical axis:

$$\Delta\varphi_{nS}(x_n, y_n) = \qquad \text{(Formula 4)}$$

$$\frac{2\pi}{\lambda_n}\left(\sqrt{x_n^2 + f_{xn}^2} - f_{xn} + \sqrt{y_n^2 + f_{yn}^2} - f_{yn}\right) - \Delta\Phi_{nS}(x_n, y_n);$$

Wherein, $$\Delta\Phi_{nS}(x_n, y_n) = \frac{2\pi}{\lambda_n}\sum_{i=0}^{\infty}\sum_{j=0}^{\infty}b_{nij}x_n^{2i}y_n^{2j}, \text{ and } 2i+2j \geq 4.$$

i=0, 1, 2, . . . , j=0, 1, 2, . . . , 2i+2j denotes order, and the condition 2i+2j≥4 is to compensate the phase shift of the 4th order or higher.

Wherein, n denotes all positive integers no greater than N, and N is the number of the collimating and deflecting meta optical members 31. $\Delta\varphi_{nS}(x_n,y_n)$ denotes the phase shift of n-th light beam (i.e., the light beam emitted by n-th light source module 2) relative to the center of optical axis of n-th shaping meta optical array 51 generated by n-th shaping meta optical array 51. The origin (0, 0) of the coordinate system is defined to be the center of optical axis of n-th shaping meta optical array 51. $\Delta\varphi_{nS}(0,0)=0$. $(x_n,y_n)$ denotes the position of each of the nanostructures of n-th shaping meta optical array 51 in the coordinate system. $\lambda_n$ is the wavelength of n-th light beam. $f_{xn}$ is the focal length of n-th light beam along the X-axis. $f_{yn}$ is the focal length of n-th light beam along the Y-axis. $\Delta\Phi_{nS}(x_n,y_n)$ is a high-order term, and is for compensating the phase shift of high-order optical aberration. $b_{nij}$ are predetermined coefficients (i.e., coefficients of polynomial).

When an optical system contains 4th order and/or higher order (2i+2j≥4) optical aberration to be compensated, the coefficients of polynomial $b_{nij}$ can be found by conventional automatic optimization methods, so as to obtain the value of $\Delta\Phi_{nS}(x_n,y_n)$. When the high-order optical aberration of an optical system need not be compensated, the coefficients of polynomial $b_{nij}$ are zero, and the value of $\Delta\Phi_{nS}(x_n,y_n)$ is zero.

In this embodiment, the number of the light source modules 2 is three and the number of the collimating and deflecting meta optical members 31 is three, so N=3, and n=1,2,3. The shaping meta optical arrays 51 respectively satisfy three phase shift formulas (i.e., n=1,2,3). n may be positive integers no greater than another integer. For example, in one embodiment, the number of the light source modules 2 is two and the number of the collimating and deflecting meta optical members 31 is two, so N=2, n=1,2, and the shaping meta optical arrays 51 respectively satisfy two phase shift formulas.

The phase shift formula of each of the shaping meta optical arrays 51 relative to the center of the optical axis is described in the following paragraphs.

For convenience, the three shaping meta optical arrays 51 are respectively named first shaping meta optical array 51, second shaping meta optical array 51 and third shaping meta optical array 51.

The nanostructures 511 of the first shaping meta optical array 51 satisfy the phase shift formula as follows:

$$\Delta\varphi_{1S}(x_1, y_1) = \qquad \text{(Formula 5)}$$

$$\frac{2\pi}{\lambda_1}\left(\sqrt{x_1^2 + f_{x1}^2} - f_{x1} + \sqrt{y_1^2 + f_{y1}^2} - f_{y1}\right) - \Delta\Phi_{1S}(x_1, y_1);$$

Wherein, $\Delta\varphi_{1S}(x_1,y_1)$ denotes the phase shift of the first light beam (i.e., red light (R), wavelength=640 nm) relative to the center of the optical axis of the first shaping meta optical array 51 generated by the first shaping meta optical array 51. The origin (0, 0) of the coordinate system is defined to be the center of the optical axis of the first shaping meta optical array 51. $\Delta\varphi_{1S}(0,0)=0$. $(x_1,y_1)$ denotes the position of each of the nanostructures 511 of the first shaping meta optical array 51 in the coordinate system. $\lambda_1$ is the wavelength of the first light beam. $f_{x1}$ is the focal length of the first light beam along the X-axis. $f_{y1}$ is the focal length of the first light beam along the Y-axis.

The nanostructures 511 of the second shaping meta optical array 51 satisfy the phase shift formula as follows:

$$\Delta\varphi_{2S}(x_2, y_2) = \qquad \text{(Formula 6)}$$

$$\frac{2\pi}{\lambda_2}\left(\sqrt{x_2^2 + f_{x2}^2} - f_{x2} + \sqrt{y_2^2 + f_{y2}^2} - f_{y2}\right) - \Delta\Phi_{2S}(x_2, y_2);$$

Wherein, $\Delta\varphi_{2S}(x_2,y_2)$ denotes the phase shift of the second light beam (i.e., green light (G), wavelength=520 nm) relative to the center of the optical axis of the second shaping meta optical array 51 generated by the second shaping meta optical array 51. The origin (0, 0) of the coordinate system is defined to be the center of the optical axis of the second shaping meta optical array 51. $\Delta\varphi_{2S}(0,0)=0$. $(x_2,y_2)$ denotes the position of each of the nanostructures 511 of the second shaping meta optical array 51 in the coordinate system. $\lambda_2$ is the wavelength of the second light beam. $f_{x2}$ is the focal length of the second light beam along the X-axis. $f_{y2}$ is the focal length of the second light beam along the Y-axis.

The nanostructures 511 of the third shaping meta optical array 51 satisfy the phase shift formula as follows:

$$\Delta\varphi_{3S}(x_3, y_3) = \qquad \text{(Formula 7)}$$

$$\frac{2\pi}{\lambda_3}\left(\sqrt{x_3^2 + f_{x3}^2} - f_{x3} + \sqrt{y_3^2 + f_{y3}^2} - f_{y3}\right) - \Delta\Phi_{3S}(x_3, y_3);$$

Wherein, $\Delta\varphi_{3S}(x_3,y_3)$ denotes the phase shift of the third light beam (i.e., blue light (B), wavelength=450 nm) relative to the center of the optical axis of the third shaping meta optical array 51 generated by the third shaping meta optical array 51. The origin (0, 0) of the coordinate system is defined to be the center of the optical axis of the third shaping meta optical array 51. $\Delta\varphi_{3S}(0,0)=0$. $(x_3,y_3)$ denotes the position of each of the nanostructures 511 of the third shaping meta optical array 51 in the coordinate system. $\lambda_3$ is the wavelength of the third light beam. $f_{x3}$ is the focal length of the third light beam along the X-axis. $f_{y3}$ is the focal length of the third light beam along the Y-axis.

When the metalens-integrated optical engine includes the shaping module 5, the phase shift formula(s) (Formula 1) of the collimating and deflecting meta optical arrays of the collimating and deflecting meta optical members 31 need to be modified such that the X-axis and the Y-axis simultaneously generate collimated light. The modified phase shift formula is as follows:

$$\Delta\varphi_{nC}(x_n, y_n) = -\frac{2\pi}{\lambda_n}\left(\sqrt{x_n^2 + f_{xcn}^2} - f_{xcn} + \sqrt{y_n^2 + f_{ycn}^2} - \right. \qquad \text{(Formula 8)}$$

$$\left. f_{ycn} - (x_n\cos\theta_n + y_n\sin\theta_n)\sin\gamma_n\right) - \Delta\Phi_{nC}(x_n, y_n);$$

-continued

Wherein, $$\Delta\Phi_{nC}(x_n, y_n) = \frac{2\pi}{\lambda_n}\sum_{i=0}^{\infty}\sum_{j=0}^{\infty} a_{nij} x_n^{2i} y_n^{2j}, \text{ and } 2i+2j \geq 4.$$

i=0,1,2, ..., j=0,1,2, ..., 2i+2j denotes order, and the condition 2i+2j≥4 is to compensate the phase shift of the 4th order or higher.

$f_{xcn}$ is the focal length of the collimating and deflecting meta optical array along the X-axis. $f_{ycn}$ is the focal length of the collimating and deflecting meta optical array along the Y-axis. When high-order optical aberration of an optical system need not be compensated, the coefficients of polynomial $\alpha_{nij}$ are zero, and the value of $\Delta\Phi_{nC}(x_n, y_n)$ is zero.

The focal lengths $f_{xn}$, $f_{yn}$ of each of the shaping meta optical arrays 51 must cooperate with the focal lengths $f_{xcn}$, $f_{ycn}$ of the collimating and deflecting meta optical array of the respective one of the collimating and deflecting meta optical members 31 to prevent astigmatic aberration. Therefore, the focal length $f_n$ in Formula 1 should be fractioned into $f_{xcn}$ and $f_{ycn}$ with respect to X-axis and Y-axis, respectively, so that the shaping meta optical arrays 51 and the collimating and deflecting meta optical members 31 cooperatively shape and collimate the light beams, and generate collimated light beam at X-axis and Y-axis, simultaneously.

For the collimating and deflecting meta optical array of each of the collimating and deflecting meta optical members 31 and the respective one of the shaping meta optical arrays 51, the relationship among the focal lengths $f_{xcn}$, $f_{ycn}$ of the collimating and deflecting meta optical array and the focal lengths $f_{xn}$, $f_{yn}$ of the shaping meta optical array 51 are as follows:

$$f_{ycn} = \frac{d \cdot f_{ytn}(d - f_{xn})}{f_{ytn}(d - f_{xn}) - f_{xn}(d - f_{xtn})}; \quad \text{(Formula 9)}$$

$$f_{xn} = \frac{f_{xcn} - d}{\frac{f_{xcn}}{f_{xtn}} - 1}; \quad \text{(Formula 10)}$$

$$f_{yn} = \frac{d \cdot f_{xn}(d - f_{xtn})}{d(d - f_{ytn}) - f_{xn}(f_{xtn} - f_{ytn})}; \quad \text{(Formula 11)}$$

$$d = \frac{d_g}{n_g}; \quad \text{(Formula 12)}$$

Wherein: $f_{xtn}$, $f_{ytn}$ are synthesized focal lengths respectively along X-axis and Y-axis synthesized by the collimating and deflecting meta optical array and the shaping meta optical array 51; d is equivalent to air thickness between the collimating and deflecting meta optical array and the shaping meta optical array 51; $d_g$ is the distance between the collimating and deflecting meta optical array and the shaping meta optical array 51; and $n_g$ is the refractive index of the medium between the collimating and deflecting meta optical array and the shaping meta optical array 51.

Since the collimating and deflecting meta optical array of each of the collimating and deflecting meta optical members 31 and the respective one of the shaping meta optical arrays 51 cooperatively shape and collimate light beam(s) simultaneously with respect to the X-axis and the Y-axis, after the synthesized focal lengths $f_{xtn}$, $f_{ytn}$ are set, once one of the focal lengths $f_{xcn}$, $f_{ycn}$ of the collimating and deflecting meta optical array and the focal lengths $f_{xn}$, $f_{yn}$ of the shaping meta optical array 51 is determined, the other three of the focal lengths $f_{xcn}$, $f_{ycn}$ of the collimating and deflecting meta optical array and the focal lengths $f_{xn}$, $f_{yn}$ of the shaping meta optical array 51 can be determined by formulas 9 to 11, so as to simultaneously accomplish collimation and shaping with respect to the X-axis and the Y-axis.

The functions, characteristics and method for preparing the metalens-integrated optical engine according to the disclosure are described as follows:

I. Nanostructure.

In this embodiment, the substrates are made of $SiO_2$. The nanostructures of each of the meta optical arrays are made of $TiO_2$, and are each configured as a pillar that has a rectangular cross-section taken along X-Y plane. The dimensions of each of the nanostructures correspond to the wavelength of n-th light beam. Specifically, for each of the nanostructures, the length is $$\frac{\lambda_n}{30} \sim \lambda_n,$$

the width is $$\frac{\lambda_n}{30} \sim \lambda_n,$$

and the height is $$\frac{\lambda_n}{100} \sim 2\lambda_n.$$

It should be noted that, in another example, the cross-section of each of the nanostructures taken along X-Y plane may be square, circular or polygonal (triangular, pentagonal, hexagonal, etc.), and each of the nanostructures taken along X-Y plane may be hollow or solid, as long as the nanostructures satisfy the phase shift formulas mentioned above.

II. The relationship between the phase and the nanostructures (the material of the substrates is $SiO_2$; the material of the nanostructures is $TiO_2$; the height along the Z-axis of each of the nanostructures is 750 nm; the period of the optical arrays on X-Y plane (i.e., the distance between centers of two adjacent nanostructures) is 210 nm).

TABLE 1 relationship between the phase and the nanostructures

| nanostructure | Length along X-axis (nm) | Length along Y-axis (nm) | phase of X-polarization (°) | phase of Y-polarization (°) |
|---|---|---|---|---|
| nanostructure (with respect to the first light beam having wavelength of 640 nm) | 50 | 50 | 17.7 | 17.7 |
| | 50 | 100 | 34.1 | 51.5 |
| | 50 | 150 | 45.5 | 106.3 |
| | 100 | 50 | 51.5 | 34.1 |
| | 100 | 100 | 9.1 | 97.1 |
| | 100 | 150 | 129.6 | 194.2 |
| nanostructure (with respect to the second light beam having wavelength of 520 nm) | 50 | 50 | 24.9 | 24.9 |
| | 50 | 100 | 46.8 | 74.3 |
| | 50 | 150 | 61.9 | 159.6 |
| | 100 | 50 | 74.3 | 46.8 |
| | 100 | 100 | 146.5 | 146.5 |
| | 100 | 150 | 199.5 | 301.3 |

TABLE 1-continued relationship between the phase and the nanostructures

| nanostructure | Length along X-axis (nm) | Length along Y-axis (nm) | phase of X-polarization (°) | phase of Y-polarization (°) |
|---|---|---|---|---|
| nanostructure (with respect to the third light beam having wavelength of 450 nm) | 50 | 50 | 33.6 | 33.6 |
| | 50 | 100 | 62.9 | 108.3 |
| | 50 | 150 | 82.9 | 242.0 |
| | 100 | 50 | 108.3 | 62.9 |
| | 100 | 100 | 226.2 | 226.2 |
| | 100 | 150 | 315.2 | 107.9 |

It should be noted that the table above is exemplary only. One skilled in the art could make nanostructures of other sizes according to the content of the table.

Figure 7:
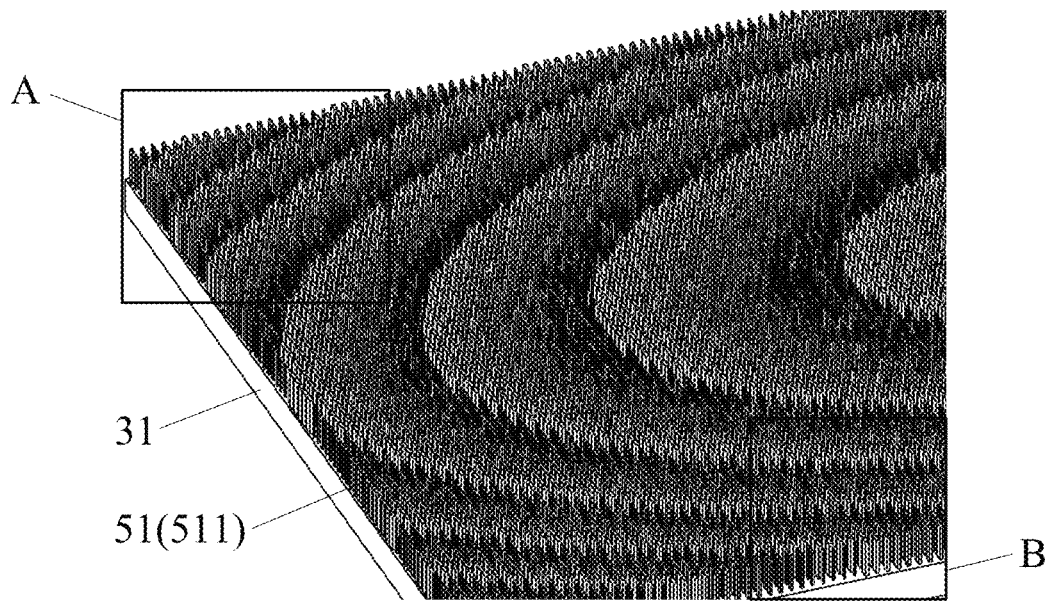
Figures 8, 9:
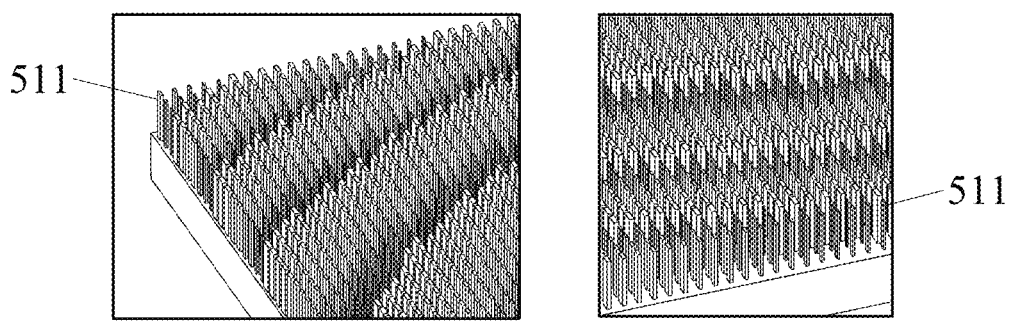
Figure 10:
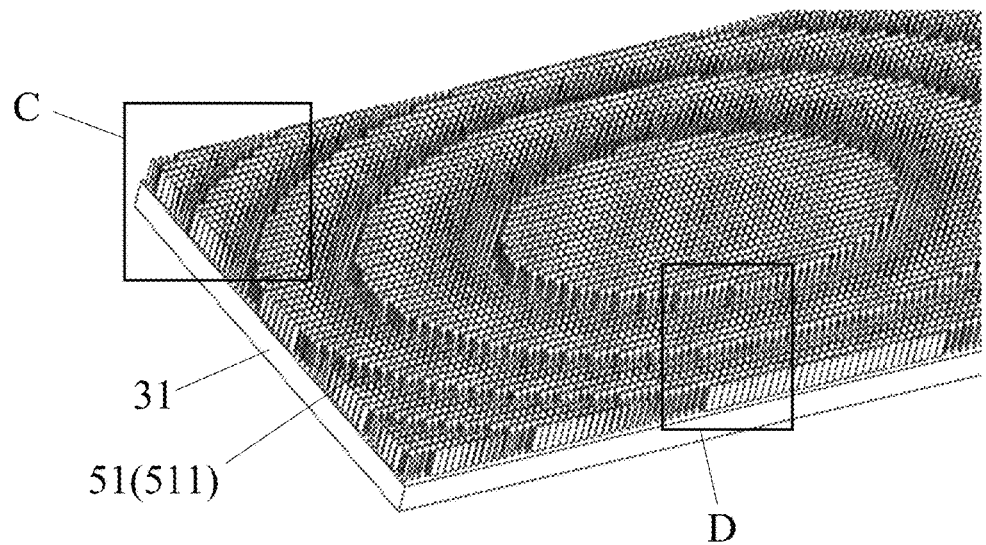
Figure 11:
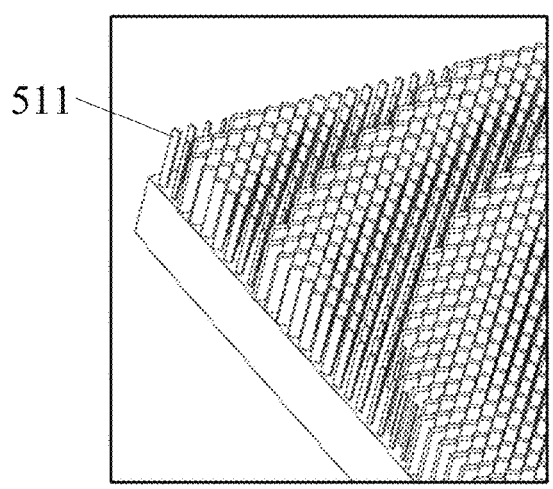
Figure 12:
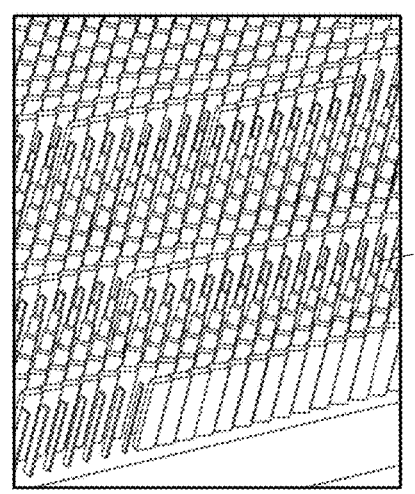

Referring to FIGS. 7 to 9, the relationship between the phase and the nanostructures above are presented by the polarization characteristics with respect to X-axis and Y-axis, and is defined by the lengths along X-axis and Y-axis. The phase shift is determined with respect to X-polarization and Y-polarization. Referring to FIGS. 10 to 12, phase of left-handed circularly polarized light and right-handed circularly polarized light can be defined by Pancharatnam-Berry phase, in which the phase is defined by the geometric sizes of the pillars and the rotated angles of the pillars, so as to obtain the phase shift of left-handed circularly polarized light and right-handed circularly polarized light. However, each of the X-polarization, Y-polarization, the left-handed circularly polarized light and the right-handed circularly polarized light is suitable for the above-mentioned phase shift formulas of $\Delta\varphi_{nC}(x_n,y_n)$, $\Delta\varphi_{nL}(x_n,y_n)$, $\Delta\varphi_{nS}(x_n, y_n)$. (In the following paragraphs, $\Delta\varphi_n(x_n,y_n)$ is used to refer to these phase shifts)

III. Method for preparing the metalens-integrated optical engine according to the disclosure.

Step 1):

Referring to FIG. 2, calculate the phase shift $\Delta\varphi_n(x_n,y_n)$ at each position of each meta optical array by virtue of the phase shift formulas respectively corresponding to the collimating and deflecting module 3, the light-combining module 4 and the shaping module 5, and determine the phase ($\varphi_n(0,0)$) at the origin of each meta optical array, so as to obtain the phase $\varphi_n(x_n,y_n)$ at each position, and fabricate the nanostructure corresponding to the phase $\varphi_n(x_n,y_n)$ according to Table 1.

For example, a nanostructure with the phase of a center of an optical axis thereof $\varphi_n(0,0)=a$ is fabricated according to Table 1, and the phase shift $\Delta\varphi_n(x_n,y_n)$ is b after calculation via the formulas. Then, $\varphi_n(x_n,y_n)=a+b$.

Step 2):

Prepare the substrates (made of $SiO_2$) for the collimating and deflecting module 3, the light-combining module 4 and the shaping module 5, and form the corresponding nanostructures (made of $SiO_2$) on the substrates via a semiconductor etching technique according to the sizes calculated, so as to form the meta optical arrays. The manufacturing method is well-understood in semiconductor fabrication, and will not be further described. In this embodiment, the collimating and deflecting module 3 needs three substrates, the light-combining module 4 needs one substrate, and the shaping module 5 shares the substrates of the collimating and deflecting module 3, so four substrates are needed in this embodiment.

Wherein, each of the collimating and deflecting meta optical members 31 has a first surface 313 that is proximate to the light source modules 2, a second surface 314 that is opposite to the first surface 313 and that is proximate to the light-combining meta optical member 40. The shaping meta optical arrays 51 of the shaping module 5 are respectively formed on the first surfaces 313 of the collimating and deflecting meta optical members 31. The collimating and deflecting meta optical array of each of the collimating and deflecting meta optical members 31 is formed on the second surface 314 of the collimating and deflecting meta optical member 31. The light-combining meta optical array of the light-combining meta optical member 40 can be formed on an arbitrary surface of the substrate 41. In this embodiment, the light-combining meta optical array is formed on a surface of the substrate 41 proximate to the collimating and deflecting module 3.

Figure 13:
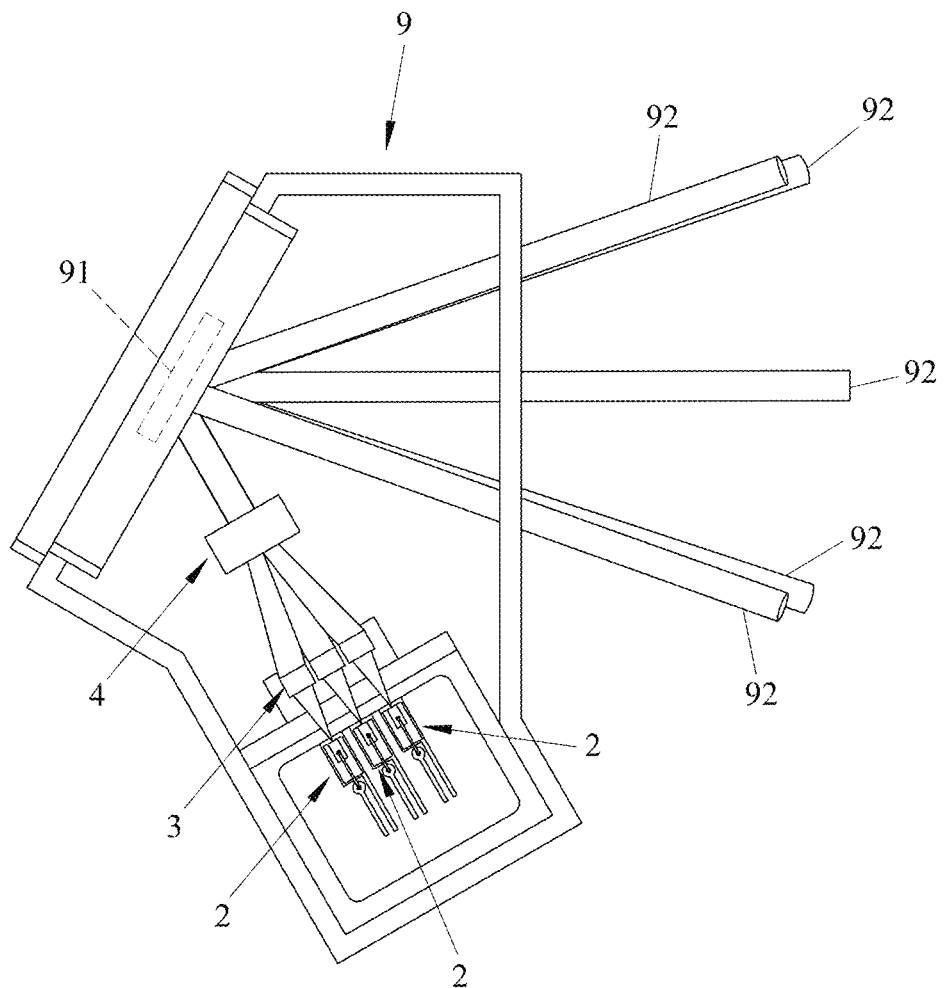
FIG. 13 is a top view illustrating the embodiment used in a projector.
Figure 14:
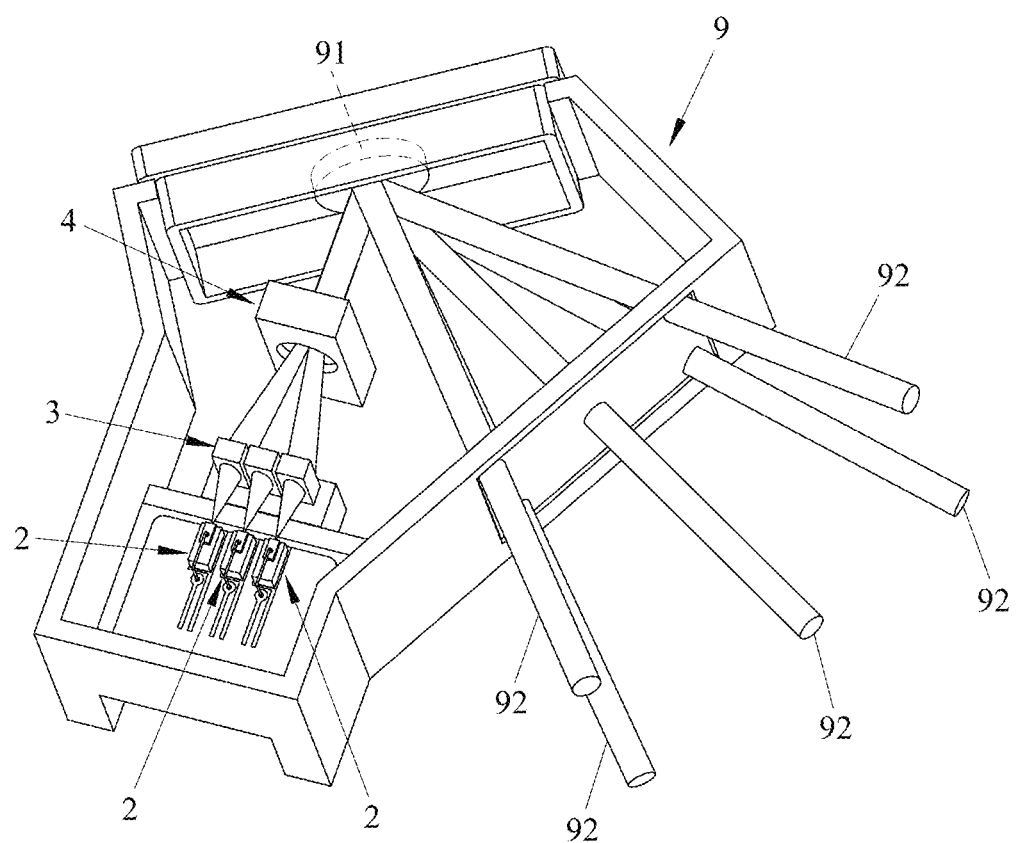
FIG. 14 is a perspective view illustrating the embodiment used in the projector.

Referring to FIGS. 2, 13 and 14, this embodiment is used in a projector 9. The projector 9 includes a MEMS (microelectromechanical systems) reflector 91 and a control circuit (not shown). The MEMS reflector 91 is controlled by the control circuit to reflect light beams emitted from the light-combining module 4, so that the light ray(s) 92 travels to a predetermined position and that a desired picture is obtained. In FIGS. 13 and 14, a plurality of light rays 92 are presented to illustrating different projecting positions. The projector 9 and the MEMS reflector 91 are well-understood in the art, and would not be further described.

Referring to FIG. 2, according to the above, the advantages of the embodiment according to the disclosure are as follows:

1. By virtue of the collimating and deflecting meta optical member 31 that collimates and deflects the light beams emitted by the light source modules 2, and by virtue of the light-combining module 4 that receives the collimated light beams in different directions, and deflects the light beams, so as to combine the light beams into a single light beam. Compared with the conventional optical engine, the number of components is reduced, the manufacturing precision and assembling precision are enhanced, and the volume of the optical engine is reduced. In addition, the meta optical members are made through a semiconductor fabrication technique, which has high manufacturing precision and high assembling precision compared with the manufacturing conventional optical components.

2. By virtue of the shaping module 5, the metalens-integrated optical engine has a function of shaping light beams. Since the function of shaping light beams are implemented by meta optical arrays, the volume of the metalens-integrated optical engine is relatively small.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A metalens-integrated optical engine comprising:
a plurality of light source modules, each of the light source modules emitting a light beam with particular wavelength;
a collimating and deflecting module including a plurality of collimating and deflecting meta optical members each of which is located on the path of the light beam emitted by a respective one of the light source modules, the collimating and deflecting meta optical members being for collimating and deflecting the light beams emitted by the light source modules such that the light beams emitted by the light source modules are collimated and deflected and travel to a predetermined position; and
a light-combining module including a light-combining meta optical member that is located at one side of the collimating and deflecting module opposite to the light source modules, the light-combining meta optical member including a light-combining meta optical array that is located at the predetermined position, that receives the light beams collimated and deflected via the collimating and deflecting module, and that deflects the light beams based on wavelengths and angles of incidence, so as to combine the non-parallel light beams into a single light beam,
wherein the light-combining meta optical member includes:
a substrate that has a surface extending along an X-axis and a Y-axis, and
a light-combining meta optical array that is disposed on the surface, that permits incidence of the light beams collimated and deflected via the collimating and deflecting module, and that includes a plurality of nanostructures that are arranged in an array, each of the nanostructures extending along a Z-axis that is perpendicular to the surface; and
wherein each of the nanostructures of the light-combining meta optical array of the light-combining meta optical member satisfy the following phase shift formula relative to center of optical axis:

$$\Delta\varphi_{nL}(x, y) = \frac{2\pi}{\lambda_n}(x\cos\theta_n + y\sin\theta_n)\sin\gamma_n;$$

wherein n denotes all positive integers no greater than N, N is the number of the collimating and deflecting meta optical members, $\Delta\varphi_{nL}(x, y)$ denotes the phase shift of n-th light beam relative to the center of optical axis of the light-combining meta optical array generated by the light-combining meta optical array, an origin (0, 0) of the coordinate system being defined to be the center of an optical axis of the light-combining meta optical array, $\Delta\varphi_{nL}(0,0)=0$, (x, y) denotes the position of each of the nanostructures of the light-combining meta optical array in the coordinate system, $\lambda_n$ being the wavelength of n-th light beam, $\theta_n$ being the angle formed between the X-axis and the incident light beam of n-th light beam, and $\gamma_n$ being the angle formed between the Z-axis and the incident light beam of n-th light beam.

2. The metalens-integrated optical engine as claimed in claim 1, wherein:
each of the collimating and deflecting meta optical members includes:
a substrate that has a surface extending along an X-axis and a Y-axis, and
a collimating and deflecting meta optical array that is disposed on the surface, that permits incidence of the light beams emitted by the respective one of the light source modules, and that includes a plurality of nanostructures that are arranged in an array, each of the nanostructures extending along a Z-axis that is perpendicular to the surface;
the nanostructures of the collimating and deflecting meta optical array of n-th collimating and deflecting meta optical member satisfy the following phase shift formula relative to a center of an optical axis:

$$\Delta\varphi_{nC}(x_n, y_n) =$$
$$-\frac{2\pi}{\lambda_n}\left(\sqrt{x_n^2 + y_n^2 + f_n^2} - f_n - (x_n\cos\theta_n + y_n\sin\theta_n)\sin\gamma_n\right) - \Delta\Phi_{nC}(x_n, y_n);$$

wherein $$\Delta\Phi_{nC}(x_n, y_n) = \frac{2\pi}{\lambda_n}\sum_{i=0}^{\infty}\sum_{j=0}^{\infty}a_{nij}x_n^{2i}y_n^{2j}, \text{ and } 2i + 2j \geq 4;$$

wherein n denotes all positive integers no greater than N, N is the number of the collimating and deflecting meta optical members, $\Delta\varphi_{nC}(x_n, y_n)$ denoting the phase shift of n-th light beam relative to the center of an optical axis of the collimating and deflecting meta optical array of n-th collimating and deflecting meta optical member generated by the collimating and deflecting meta optical array of n-th collimating and deflecting meta optical member, an origin (0, 0) of the coordinate system being defined to be the center of the optical axis of the collimating and deflecting meta optical array of n-th collimating and deflecting meta optical member, $\Delta\varphi_{nC}(0,0)=0$, $(x_n, y_n)$ denotes the position of each of the nanostructures of the collimating and deflecting meta optical array of n-th collimating and deflecting meta optical member in the coordinate system, $\lambda_n$ being the wavelength of n-th light beam, $f_n$ being the focal length of n-th light beam, $\theta_n$ being the angle formed between the X-axis and the imaging light beam of n-th light beam, $\gamma_n$ being the angle formed between the Z-axis and the imaging light beam of n-th light beam, and $\Delta\Phi_{nC}(x_n, y_n)$ being high-order term, and being for compensating the phase shift of high-order optical aberration, $\alpha_{nij}$ being predetermined coefficients.

3. The metalens-integrated optical engine as claimed in claim 1, wherein the light-combining meta optical array is located at one side of the substrate of the light-combining meta optical member proximate to the collimating and deflecting module.

4. A metalens-integrated optical engine comprising:
a plurality of light source modules, each of the light source modules emitting a light beam with particular wavelength;

a collimating and deflecting module including a plurality of collimating and deflecting meta optical members each of which is located on the path of the light beam emitted by a respective one of the light source modules, the collimating and deflecting meta optical members being for collimating and deflecting the light beams emitted by the light source modules such that the light beams emitted by the light source modules are collimated and deflected and travel to a predetermined position;

a light-combining module including a light-combining meta optical member that is located at one side of the collimating and deflecting module opposite to the light source modules, the light-combining meta optical member including a light-combining meta optical array that is located at the predetermined position, that receives the light beams collimated and deflected via the collimating and deflecting module, and that deflects the light beams based on wavelengths and angles of incidence, so as to combine the non-parallel light beams into a single light beam; and a shaping module including a plurality of shaping meta optical arrays, each of the shaping meta optical arrays being disposed on a disposing surface of a respective one of the collimating and deflecting meta optical members, permitting incidence of the light beams emitted by the respective one of the light source modules, and including a plurality of nanostructures that are arranged in an array, each of the shaping meta optical arrays having a coordinate system that has an X-axis, a Y-axis and a Z-axis, and the disposing surface of the respective one of the collimating and deflecting meta optical members extending along the X-axis and the Y-axis, each of the nanostructures extending along a Z-axis that is perpendicular to the disposing surface;

wherein the nanostructures of n-th shaping meta optical array satisfy the following phase shift formula relative to center of optical axis:

$$\Delta\varphi_{nS}(x_n, y_n) = \frac{2\pi}{\lambda_n\left(\sqrt{x_n^2 + f_{xn}^2} - f_{xn} + \sqrt{y_n^2 + f_{yn}^2} - f_{yn}\right)} - \Delta\Phi_{nS}(x_n, y_n);$$

wherein $$\Delta\Phi_{nS}(x_n, y_n) = \frac{2\pi}{\lambda_n}\sum_{i=0}^{\infty}\sum_{j=0}^{\infty} b_{nij} x_n^{2i} y_n^{2j}, \text{ and } 2i + 2j \geq 4;$$

wherein n denotes all positive integers no greater than N, N is the number of the collimating and deflecting meta optical members, $\Delta\varphi_{nS}(x_n, y_n)$ denotes the phase shift of n-th light beam relative to the center of optical axis of n-th shaping meta optical array generated by n-th shaping meta optical array, an origin (0, 0) of the coordinate system being defined to be the center of an optical axis of n-th shaping meta optical array, $\Delta\varphi_{nS}(0, 0)=0$, $(x_n, y_n)$ denotes the position of each of the nanostructures of n-th shaping meta optical array in the coordinate system, $\lambda_n$ being the wavelength of n-th light beam, $f_{xn}$ being the focal length of n-th light beam along the X-axis, $f_{yn}$ being the focal length of n-th light beam, along the Y-axis, and $\Delta\Phi_{nS}(x_n, y_n)$ being high-order term, and being for compensating the phase shift of high-order optical aberration, $b_{nij}$ being predetermined coefficients.

5. The metalens-integrated optical engine as claimed in claim 4, wherein each of the shaping meta optical arrays of the shaping module is located at a first surface of the respective one of the collimating and deflecting meta optical members that is proximate to the light source modules, each of the collimating and deflecting meta optical members including a collimating and deflecting meta optical array that is formed on a second surface of the collimating and deflecting meta optical member proximate to the light-combining meta optical member and that is opposite to the shaping meta optical arrays.

6. A metalens-integrated optical engine comprising:

a plurality of light source modules, each of the light source modules emitting a light beam with particular wavelength;

a collimating and deflecting module including a plurality of collimating and deflecting meta optical members each of which is located on the path of the light beam emitted by a respective one of the light source modules, the collimating and deflecting meta optical members being for collimating and deflecting the light beams emitted by the light source modules such that the light beams emitted by the light source modules are collimated and deflected and travel to a predetermined position, each of the collimating and deflecting meta optical members including:

a substrate that has a surface extending along an X-axis and a Y-axis, and a collimating and deflecting meta optical array that is disposed on the surface, that permits incidence of the light beams emitted by the respective one of the light source modules, and that includes a plurality of nanostructures arranged in an array, each of the nanostructures extending along a Z-axis that is perpendicular to the surface, wherein the nanostructures of the collimating and deflecting meta optical array of n-th collimating and deflecting meta optical member satisfy the following phase shift formula relative to a center of an optical axis:

$$\Delta\varphi_{nC}(x_n, y_n) =$$
$$-\frac{2\pi}{\lambda_n}\left(\sqrt{x_n^2 + f_{xcn}^2} - f_{xcn} + \sqrt{y_n^2 + f_{ycn}^2} - f_{ycn} - (x_n\cos\theta_n + y_n\sin\theta_n)\sin\gamma_n\right) -$$
$$\Delta\Phi_{nC}(x_n, y_n);$$

wherein $$\Delta\Phi_{nC}(x_n, y_n) = \frac{2\pi}{\lambda_n}\sum_{i=0}^{\infty}\sum_{j=0}^{\infty} a_{nij} x_n^{2i} y_n^{2j}, \text{ and } 2i + 2j \geq 4,$$

wherein n denotes all positive integers no greater than N, N is the number of the collimating and deflecting meta optical members, $\Delta\varphi_{nC}(x_n, y_n)$ denotes the phase shift of n-th light beam relative to the center of an optical axis of the collimating and deflecting meta optical array of n-th collimating and deflecting meta optical member generated by the collimating and deflecting meta optical array of n-th collimating and deflecting meta optical member, an origin (0, 0) of the coordinate system being defined to be the center of the optical axis of the collimating and deflecting meta optical array of n-th collimating and deflecting meta optical member, $\Delta\varphi_{nC}(0,0)=0$, $(x_n, y_n)$ denotes the position of each of the nanostructures of the collimating and deflecting meta optical array of n-th collimating and deflecting meta optical member in the coordinate system, $\lambda_n$ being the wavelength of n-th light beam, $f_{xcn}$ being the focal length of the collimating and deflecting meta optical array along the X-axis, $f_{ycn}$ being the focal length of the collimating and deflecting meta optical array along the Y-axis, $\theta_n$ being the angle formed between the X-axis and the imaging light beam of n-th light beam, $\gamma_n$ being the angle formed between the Z-axis and the imaging light beam of n-th light beam, $\Delta\Phi_{nC}(x_n, y_n)$ being high-order term, and being for compensating the phase shift of high-order optical aberration, $\alpha_{nij}$ being predetermined coefficients;

a shaping module including a plurality of shaping meta optical arrays, each of the shaping meta optical arrays being disposed on a disposing surface of a respective one of the collimating and deflecting meta optical members for shaping the light beams emitted by the respective one of the light source modules; and a light-combining module receiving the light beams collimated and deflected via the collimating and deflecting module, and combining the non-parallel light beams into a single light beam, wherein the collimating and deflecting meta optical arrays of each of the collimating and deflecting meta optical members are formed on a surface of the collimating and deflecting meta optical member proximate to the light-combining meta optical member, and each of the shaping meta optical arrays of the shaping module is located at another surface of the respective one of the collimating and deflecting meta optical members that is proximate to the light source modules.

7. The metalens-integrated optical engine as claimed in claim 6, wherein:

for the collimating and deflecting meta optical array of each of the collimating and deflecting meta optical members and the respective one of the shaping meta optical arrays, the relationship among the focal lengths $f_{xcn}$, $f_{ycn}$ of the collimating and deflecting meta optical array and the focal lengths $f_{xn}$, $f_{yn}$ of the shaping meta optical array are:

$$f_{ycn} = \frac{d \cdot f_{ytn}(d - f_{xn})}{f_{ytn}(d - f_{xn}) - f_{xn}(d - f_{xtn})};$$

$$f_{xn} = \frac{f_{xcn} - d}{\frac{f_{xcn}}{f_{xtn}} - 1};$$

$$f_{yn} = \frac{d \cdot f_{xn}(d - f_{xtn})}{d(d - f_{ytn}) - f_{xn}(f_{xtn} - f_{ytn})};$$

$f_{xtn}$, $f_{ytn}$ are synthesized focal lengths respectively along X-axis and Y-axis synthesized by the collimating and deflecting meta optical array and the shaping meta optical array, and d is equivalent air thickness between the collimating and deflecting meta optical array and the shaping meta optical array.

8. The metalens-integrated optical engine as claimed in claim 6, wherein:

each of the shaping meta optical arrays receives the light beams emitted by the respective one of the light source modules, and including a plurality of nanostructures that are arranged in an array, each of the shaping meta optical arrays having a coordinate system that has an X-axis, a Y-axis and a Z-axis, each of the nanostructures extending along a Z-axis that is perpendicular to the surface;

the nanostructures of n-th shaping meta optical array satisfy the following phase shift formula relative to center of optical axis $$\Delta\varphi_{nS}(x_n, y_n) = \frac{2\pi}{\lambda_n}\left(\sqrt{x_n^2 + f_{xn}^2} - f_{xn} + \sqrt{y_n^2 + f_{yn}^2} - f_{yn}\right) - \Delta\Phi_{nS}(x_n, y_n);$$

wherein $$\Delta\Phi_{nS}(x_n, y_n) = \frac{2\pi}{\lambda_n}\sum_{i=0}^{\infty}\sum_{j=0}^{\infty} b_{nij} x_n^{2i} y_n^{2j}, \text{ and } 2i + 2j \geq 4;$$

wherein n denotes all positive integers no greater than N, N is the number of the collimating and deflecting meta optical members, $\Delta\varphi_{nS}(x_n, y_n)$ denotes the phase shift of n-th light beam relative to the center of optical axis of n-th shaping meta optical array generated by n-th shaping meta optical array, an origin (0, 0) of the coordinate system being defined to be the center of optical axis of n-th shaping meta optical array, $\Delta\varphi_{nS}(0, 0) = 0$, $(x_n, y_n)$ denotes the position of each of the nanostructures of n-th shaping meta optical array in the coordinate system, $\lambda_n$ being the wavelength of n-th light beam, $f_{xn}$ being the focal length of n-th light beam along the X-axis, $f_{yn}$ being the focal length of n-th light beam along the Y-axis, $\Delta\Phi_{nS}(x_n, y_n)$ being high-order term, and being for compensating the phase shift of high-order optical aberration, $b_{nij}$ being predetermined coefficients.

\* \* \* \* \*